Figure 1:
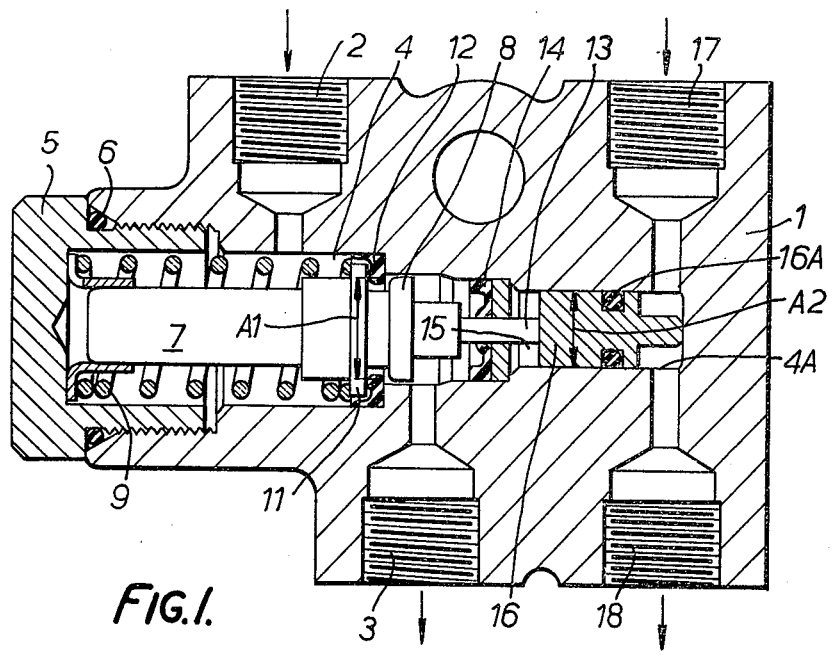

United States Patent [19]
Farr

[11] 3,976,334
[45] Aug. 24, 1976

[54] VEHICLE BRAKE PRESSURE CONTROL VALVES FOR USE IN DUAL PRESSURE SYSTEMS

[75] Inventor: Glyn Phillip Reginald Farr, Birmingham, England

[73] Assignee: Girling Limited, Birmingham, England

[22] Filed: May 12, 1975

[21] Appl. No.: 576,643

[30] Foreign Application Priority Data
May 17, 1974 United Kingdom............... 22120/74

[52] U.S. Cl. ............................ 303/6 C; 188/151 A; 188/349; 303/84 A
[51] Int. Cl.² ...................... B60T 8/26; B60T 17/18
[58] Field of Search ................. 303/6C, 6 R, 9, 84; 188/349, 151 A; 200/82 D; 340/52 C

[56] References Cited
UNITED STATES PATENTS

| 3,427,416 | 2/1969 | Papin | 303/84 A |
| 3,504,946 | 4/1970 | Valentine et al. | 303/6 R X |
| 3,545,814 | 12/1970 | Margetts | 303/84 A |
| 3,614,169 | 10/1971 | Bueler | 303/6 C |
| 3,661,426 | 5/1972 | Tam | 303/6 C |

Primary Examiner—Trygve M. Blix
Assistant Examiner—Douglas C. Butler
Attorney, Agent, or Firm—Scrivener Parker Scrivener and Clarke

[57] ABSTRACT

A pressure control valve for a braking system having separate pressure circuits comprises a control member movable to control communication between an inlet and an outlet for connection in one of the circuits and spring biased to a valve open position. The control member has an extension which passes sealingly into a space between and sealed from the two circuits and which engages a piston subject to the pressure in the other circuit. The piston is separate from the control member and is operable under the pressure in that other circuit to overcome the spring bias and close the valve by displacing the control member.

8 Claims, 3 Drawing Figures

VEHICLE BRAKE PRESSURE CONTROL VALVES FOR USE IN DUAL PRESSURE SYSTEMS

This invention relates to pressure control valves for vehicle braking systems of the type comprising separate pressure circuits for supplying different wheel brakes of the vehicles.

In such braking systems, it is well known to provide a pressure control valve for reducing or limiting the brake pressure applied at the rear wheels, relative to the pressure at the front wheels, once a predetermined braking pressure has been exceeded. It is also known to provide means for disabling the control valve in the event of the front line pressure circuit failing. The control valve may, for example, be disabled by preventing the valve from closing (or "cutting off") or by opening up a by-pass, the object in each case being to provide for free pressure communication between the inlet and outlet of the valve connected in the rear brake pressure circuit.

It is, however, a disadvantage of known pressure control valves that no indication of a failure of the means for disabling the control valve, for example due to seal failure, is given until a failure of the front pressure circuit arises.

In accordance with the present invention, there is provided a pressure control valve for a braking system having separate pressure circuits, comprising a control valve member movable to control communication between an inlet and an outlet for connection in one of the circuits, and resilient means biasing the control member in a sense to hold the valve open, wherein the control member has an extension which passes sealingly into a space intermediate and sealed from the two circuits and engages with a pressure responsive member separate from the control member and subject to the pressure prevailing in the other circuit, the pressure responsive member being operable under the last-mentioned pressure to overcome the biasing force of the resilient means to displace the control member and close the valve.

Thus, any failure of the second circuit or of the pressure responsive means (such as a seal failure), will be reflected in abnormal behaviour of the control valve since the pressure responsive member will not overcome the biasing force of the resilient means and the valve will remain permanently open.

Figure 3:
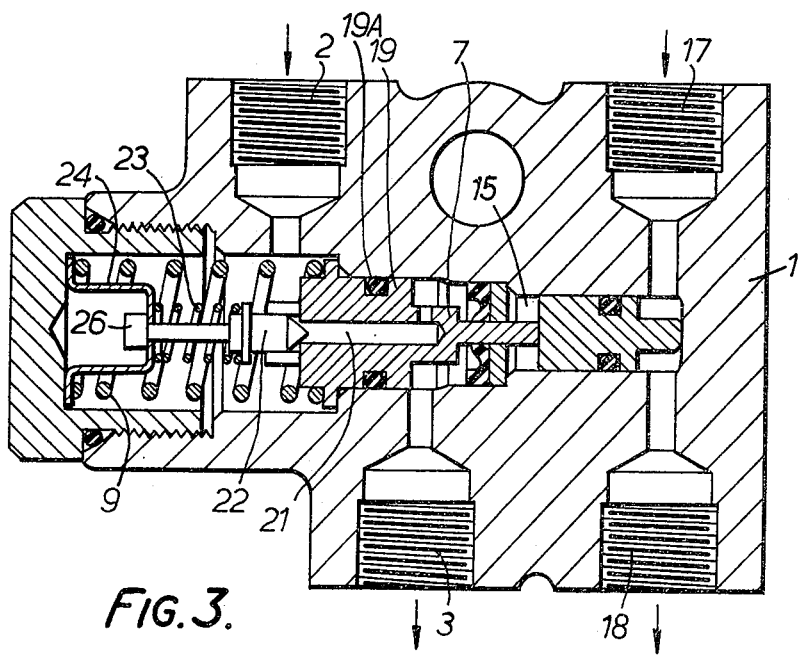
Figure 2:
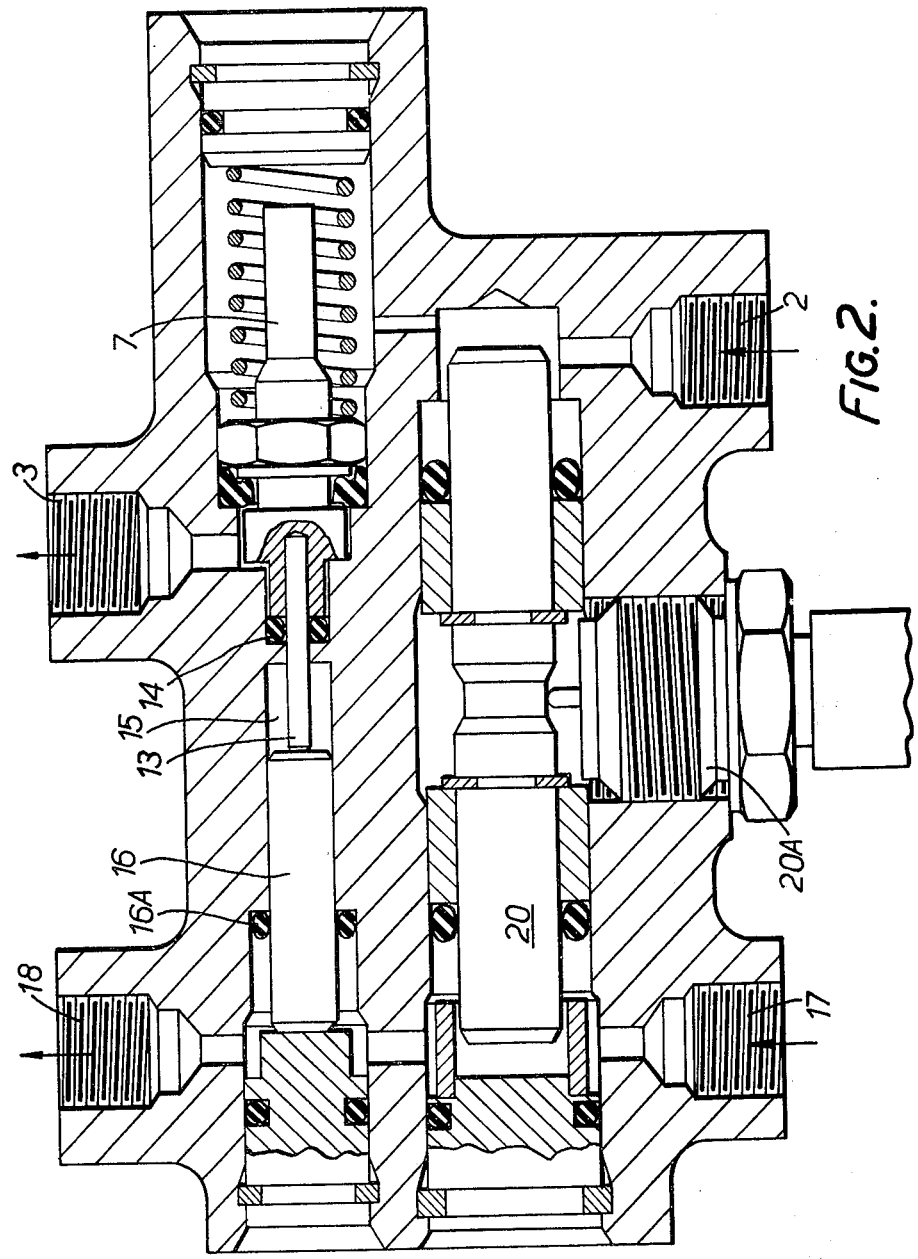

Three embodiments of the invention will now be described in detail, by way of example, with reference to the accompanying drawings, in which FIGS. 1 to 3 are axial cross-sections of the respective valves.

The valve shown in FIG. 1 is a pressure reducer valve comprising a housing 1 having an inlet 2 and an outlet 3 communicating with a valve bore 4, closed at its left-hand end by a closure plug 5 having a static seal 6. A valve plunger 7 having a valve head or closure member 8 is mounted in the bore and urged by a pre-stressed control spring 9 to the extreme right-hand position shown in the drawing. In this normal, open position of the plunger, a flange 11 on the plunger engages a plurality of projections formed on one face of an annular valve seal 12, the projections providing between them passages for the free flow of liquid from the inlet to the outlet. A small diameter extension 13 of the plunger 7 extends through an annular seal 14, which is a dynamic or sliding seal relative to the extension 13, and abuts a separate pressure responsive member in the form of a piston 16 having a dynamic or sliding seal 16A working in a small diameter end portion 4A of the valve bore, which portion has an inlet 17 and outlet 18 for connection to a pressure circuit which is hydraulically separated from the pressure circuit connected to the inlet 2 and outlet 3. The space 15 between the seals 14 and 16A is vented to atmosphere.

Typically, the inlet 2 is connected in use to a first pressure source, such as one pressure space of a tandem master cylinder, and the outlet 3 to the rear wheel brakes of the vehicle; the inlet 17 and outlet 18 are connected to another pressure space of the master cylinder and to the front wheel brakes, respectively. In normal operation, the pressures at the two inlets will be equal.

In use, under normal operating conditions, operation of the brake master cylinder creates a pressure in both inlets 2 and 17, liquid flowing freely to the two outlets. The effect of pressure on the small diameter of extension 13 is relatively small and may be ignored, the opposed areas of the plunger 7 exposed to respective pressures at the inlet and outlet being substantially equal so that the pressure force on plunger 7 is balanced, but the pressure acting on piston 16 is counteracted by the spring 9. When the pressure in the inlets reaches a predetermined load, the piston 16 and plunger 7 move to the left, against the action of the spring, to close the valve head 8 against the plain, right-hand face of seal 12, to cut off the inlet 2 from the outlet 3.

Any further increase in pressure at the inlet 2 now acts over the sealed area (A1) of head 8 in a sense to return the plunger 7 to the right and is opposed by the increased pressure acting over the smaller area A2 of the piston 16, assisted by the pressure prevailing at the outlet at the time of initial closure, acting on the sealed area A1 on the outlet side of the valve head 8. This imbalance causes the plunger to return to the right to re-open the valve, and meter pressure fluid through to the outlet at a reduced rate, relative to the rate of pressure increase at the inlet.

The pressure reduction ratio is determined by the relative areas A1 and A2 which may, for example, be in the ratio of 3:2, to produce a metering ratio of 3:1, that is, after initial closure or "cut-off" the rear wheel brake pressure at outlet 3 will rise by 33 p.s.i. for every 200 p.s.i. of additional pressure at the inlet 2. To illustrate further, if the pre-stress of spring 9 is 80 lb, the area A1 is 0.3 in² and the area A2 is 0.2 in², the valve will first close at a pressure $P_1$ when $0.2P_1 = 80$ therefore $P_1 = 400$ p.s.i.

At an inlet pressure of 600 p.s.i. the outlet pressure $P_0$ will be given by the formula:
$$80 + 600 \times 0.3 = P_0 \times 0.3 + 600 \times 0.2$$

i.e. $P_0 = 466$

It will be readily understood that failure of the front line pressure fed to inlet 17, or failure of piston seal 16A, will remove the hydraulic thrust on piston 16 which is required to effect initial closure of the valve, which will therefore remain open to transmit all available braking pressure to the rear brakes. An indication of the abnormal operation of the valve may be transmitted to the driver to indicate a failure. Similarly, a partial failure of the front brake pressure circuit will have the effect of delaying initial closure of the valve.

In normal operation of the valve, the piston 16 is operative in that it shares in all movements of the plunger 7, with the dual advantages that the seal on piston 16 is kept exercised, to guard against its seizure by corrosion, and that failure of the piston seal will be exhibited by abnormal operation of the valve, specifically by disabling the valve.

The valve shown in FIG. 2 is generally similar to that of FIG. 1 and has corresponding parts identified by the same reference numerals.

In the embodiment the small diameter extension 13 is formed separately from the plunger 7 and is secured thereto, and the extension 13 and piston 16 are sealed by respective dynamic O-ring seals 14, 16A located against shoulders of the stepped bore 4. The valve additionally comprises a pressure differential warning actuator having a differential piston 20 subjected at its opposite ends to the pressures in the respective circuits. A differential pressure between the two circuits results in movement of the piston 12 to actuate a switch 20A.

The valve shown in FIG. 3 is generally similar to that of FIG. 1 and has corresponding parts identified by the same reference numerals.

The difference between the two valves resides in the construction and function of the internal valve set. In this embodiment, the plunger 7 has a piston head 19 carrying a dynamic or sliding seal 19A. A valve port 21 is formed through head 19 and is normally open to permit free communication between the inlet 2 and outlet 3. The valve closure member in this case is formed by a poppet valve member 22 having a frustoconical nose portion for co-operation with the valve port 21. The member 22 is urged into closing engagement by a light valve spring 23, but is held off by engagement of a retaining cap 24 with an enlarged tail portion 26.

Initial closure of the valve is effected, as before, by the piston 16 moving to the left, against the action of spring 9 under the pressure in inlet 17. Leftward movement of the plunger brings the mouth of port 21 into sealing engagement with the poppet valve member 22, to cut off the inlet 2 from outlet 3. Any further pressure increase at inlet 2 now acts on the inlet side of piston head 19, in opposition to the pressure on piston 16 and the prevailing pressure at the outlet 3 which acts on the outlet side of the piston head 19, and the cyclic metering action characteristic of the first embodiment is again established.

In each of the above-described valves the space 15 between the seals 14 and 16A is vented to atmosphere and ensures that even if one of the seals should fail one of the circuits still remains operative. The embodiments of FIGS. 1 and 2 have only two dynamic seals for relatively moving parts, namely the seal 14, 16A. Thus, the effect of seal resistance can be more closely controlled and compensated for than in the valve of FIG. 3 which has the additional seal 19A.

It will be appreciated that in the closed condition of each valve, the inlet 2 is separated from ambient atmosphere by the static seal 6 only, without the need for a dynamic seal interposed between the inlet and atmosphere.

What we claim is:

1. A pressure control valve for a braking system having separate pressure circuits, comprisng an inlet and an outlet for connection in one of said circuits, a control valve member movable to control communication between said inlet and said outlet, resilient means biasing said control member in a sense to hold said valve open, means defining a space intermediate and permanently sealed from both said circuits, said control member having an extension which passes sealingly into said space, and a pressure responsive member separate from said control member and subject to the pressure prevailing in said other circuit, wherein said extension has a cross-sectional area which is smaller than any other part of the control member and engages said pressure responsive member within said space, said pressure responsive member being operable under the last-mentioned pressure in said other circuit to overcome the biasing force of said resilient means thereby displacing said control member and closing the valve.

2. A valve according to claim 1, including a dynamic seal separating said space from said outlet, wherein said extension passes through said seal.

3. A valve according to claim 2, including a fixed wall which supports said seal and through which said extension passes.

4. A valve according to claim 2, including a dynamic seal which separates said space from said other circuit and which seals around said pressure responsive member, wherein said seals are the only dynamic seals of said valve.

5. A valve according to claim 1, including a dynamic seal which separates said space from said other circuit and which seals around said pressure responsive member.

6. A valve according to claim 1, wherein said extension has simple abutting engagement with said pressure responsive member.

7. A pressure control valve for a braking system having first and second separate pressure circuits, comprising an inlet and an outlet for connection in said first circuit, a control valve member movable to control communication between said inlet and said outlet and including opposed substantially equal areas exposed to respective inlet and outlet pressures, resilient means biasing said control member in a sense to hold said valve open, means defining a space intermediate and permanently sealed from both said circuits, said means including one side of a pressure responsive member separate from said control member and whose opposite side is subject to the pressure prevailing in said second circuit, and an extension carried by one of said members and sealingly extending through said sealed space into engagement with the other of said members, said extension having a cross sectional area sufficiently smaller than any cross sectional areas of said control valve member and said pressure responsive member exposed to pressure in the respective circuits as to have substantially no effect on the response of either of said members to pressure in the respective circuits.

8. The valve of claim 7 wherein said extension is carried by said control valve member and sealing extends into said sealed space into engagement with the one side of said pressure responsive member.

* * * * *